United States Patent
Murai

(10) Patent No.: US 11,353,122 B2
(45) Date of Patent: Jun. 7, 2022

(54) GATE VALVE

(71) Applicant: SMC CORPORATION, Chiyoda-ku (JP)

(72) Inventor: Takayuki Murai, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/054,082

(22) PCT Filed: May 10, 2019

(86) PCT No.: PCT/JP2019/018664
§ 371 (c)(1),
(2) Date: Nov. 9, 2020

(87) PCT Pub. No.: WO2019/216398
PCT Pub. Date: Nov. 14, 2019

(65) Prior Publication Data
US 2021/0190214 A1 Jun. 24, 2021

(30) Foreign Application Priority Data
May 10, 2018 (JP) .............................. JP2018-091346

(51) Int. Cl.
*F16K 3/32* (2006.01)
*F16K 3/314* (2006.01)
*F16K 27/04* (2006.01)

(52) U.S. Cl.
CPC ................ *F16K 3/32* (2013.01); *F16K 3/314* (2013.01); *F16K 27/04* (2013.01)

(58) Field of Classification Search
CPC ... F16K 3/32; F16K 3/314; F16K 3/12; F16K 3/316; F16K 27/04
(Continued)

(56) References Cited

U.S. PATENT DOCUMENTS

| | | | |
|---|---|---|---|
| 1,089,160 A | 3/1914 | Scherr | |
| 2,124,334 A * | 7/1938 | Gray | ........................ F16K 3/12 251/327 |

(Continued)

FOREIGN PATENT DOCUMENTS

| | | |
|---|---|---|
| CA | 2 568 681 A1 | 9/2007 |
| CN | 102494150 A | 6/2012 |

(Continued)

OTHER PUBLICATIONS

International Search Report dated Aug. 6, 2019 in PCT/JP2019/018664 filed on May 10, 2019, 2 pages.

(Continued)

*Primary Examiner* — John Bastianelli
(74) *Attorney, Agent, or Firm* — Oblon, McClelland, Maier & Neustadt, L.L.P.

(57) ABSTRACT

A gate valve includes a valve box; a linear channel formed inside the valve box; a valve disc displaceable in an axis direction perpendicular to the channel and that can obstruct the channel by the external surface thereof abutting the inner wall of the channel; a valve rod that extends from the base end of the valve disc; and a valve chamber that accommodates the valve disc. The external surface of the portion of the valve disc protruding into the channel while in an open position is configured to be a streamline curved face.

8 Claims, 8 Drawing Sheets

(58) Field of Classification Search
USPC .................................................. 251/326–329
See application file for complete search history.

(56) References Cited

U.S. PATENT DOCUMENTS

| | | | | |
|---|---|---|---|---|
| 2,420,849 A * | 5/1947 | Wilson | .................. | F16K 3/28 |
| | | | | 251/326 |
| 2,911,186 A * | 11/1959 | Granville | ................ | F16K 3/243 |
| | | | | 251/191 |
| 3,006,597 A * | 10/1961 | Hookway | ................ | F16K 27/04 |
| | | | | 251/88 |
| 3,043,555 A * | 7/1962 | Breher | .................. | F16K 3/28 |
| | | | | 251/187 |
| 3,217,735 A * | 11/1965 | Stalter | .................. | F16K 3/28 |
| | | | | 137/329.05 |
| 3,380,710 A * | 4/1968 | Pletcher | ................ | F16K 3/28 |
| | | | | 251/266 |
| 3,420,499 A * | 1/1969 | Pletcher | ................ | F16K 3/28 |
| | | | | 251/266 |
| 3,826,274 A * | 7/1974 | Moen | ................... | F16K 3/24 |
| | | | | 137/467 |
| 3,961,768 A * | 6/1976 | Veugelers | ................ | F16K 3/28 |
| | | | | 251/191 |
| 4,592,534 A * | 6/1986 | Ueda | .................. | F16K 3/22 |
| | | | | 251/266 |
| 4,671,489 A * | 6/1987 | Jankovic | ................ | F16K 39/04 |
| | | | | 251/327 |
| 4,742,987 A * | 5/1988 | Kanamori | ................ | F16K 3/314 |
| | | | | 251/123 |
| 5,439,024 A * | 8/1995 | Zimmerly | ................ | F16K 3/28 |
| | | | | 134/166 C |
| 7,255,329 B1 * | 8/2007 | Sedens | ................... | F16K 3/314 |
| | | | | 251/327 |
| 2013/0240768 A1 * | 9/2013 | Benson | ................... | F16K 31/50 |
| | | | | 251/273 |

FOREIGN PATENT DOCUMENTS

| | | |
|---|---|---|
| CN | 206377291 U | 8/2017 |
| JP | 50-121324 A1 | 10/1975 |
| JP | 60-139961 U | 9/1985 |
| JP | 6-265029 A | 9/1994 |
| JP | 2005-155737 A | 6/2005 |

OTHER PUBLICATIONS

Extended European Search Report dated Jan. 11, 2022 in European Patent Application No. 19799885.9, 8 pages.

* cited by examiner

FIG. 1A
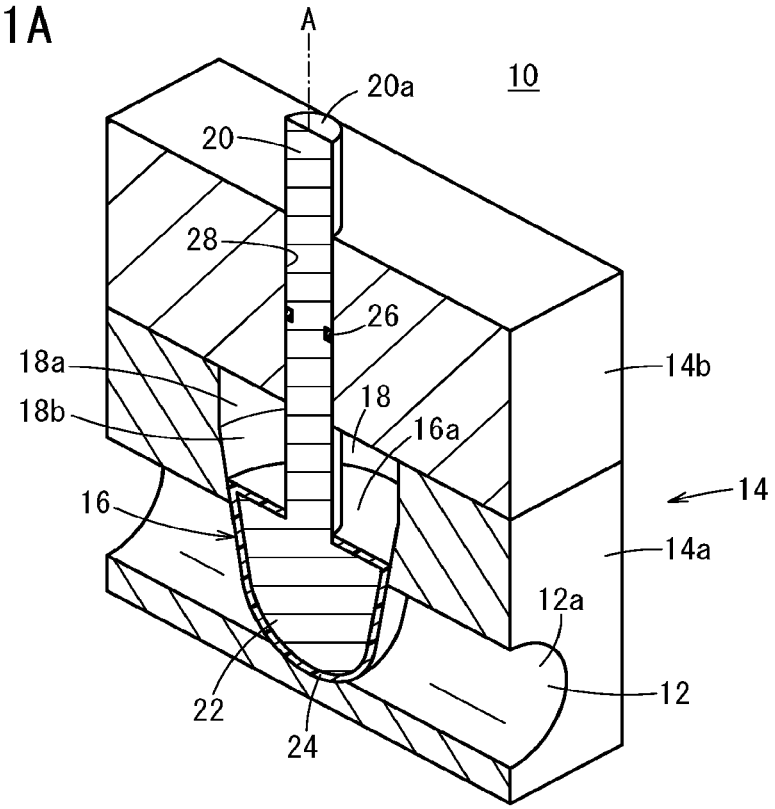
FIG. 1B
FIG. 1C
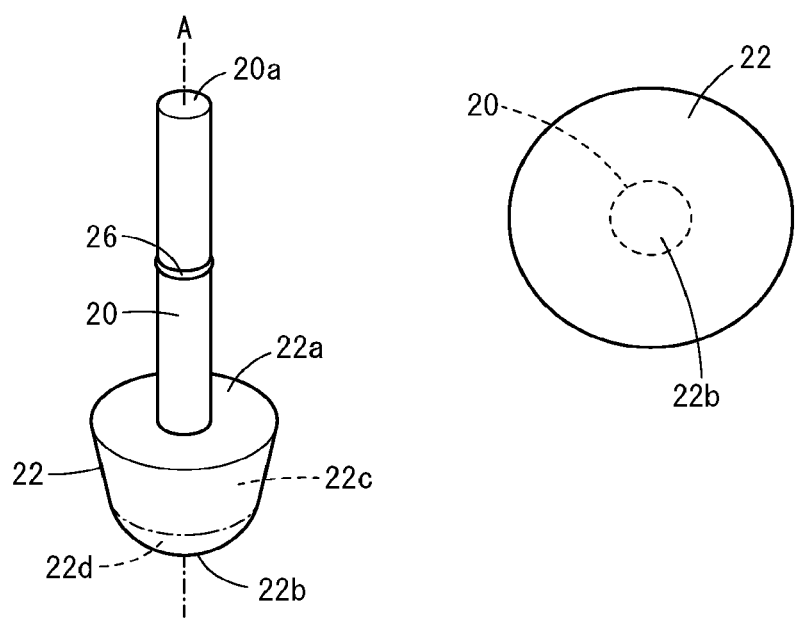

GATE VALVE

TECHNICAL FIELD

The present invention relates to gate valves.

BACKGROUND ART

A known gate valve that has been proposed moves a gate up and down in a direction orthogonal to a flow path to open and close the flow path. For example, a gate valve described in Japanese Laid-Open Patent Publication No. 06-265029 includes a gate provided with a seal member protruding from the body of the gate valve to ensure sealing performance. The seal member extends in a direction across the flow path and comes into contact with the flow path in the circumferential direction of the flow path.

SUMMARY OF INVENTION

However, the known gate valve is not provided in consideration of flow of fluid flowing around the gate. Thus, when the gate stops in mid-stroke, the seal member on the surface of the gate prevents smooth flow of fluid and causes turbulence around the gate. As a result, fluid becomes harder to flow when the gate stops in mid-stroke. Thus, in the known gate valve, the gate needs to be raised by a considerable distance to allow a larger volume of fluid to flow. That is, the known gate valve needs a longer stroke range of the gate.

The present invention has the object of providing a gate valve allowing a large volume of fluid to flow even when a gate stops in mid-stroke (while part of the gate is blocking a linear flow path).

A gate valve according to an aspect of the present invention comprises a valve body including a flow path with a linear shape, and a valve chamber disposed in a side portion of the flow path, a gate accommodated in the valve chamber and configured to move in an axial direction perpendicular to the flow path to close the flow path by bringing an outer surface of the gate into contact with an inner surface of the flow path, and a stem extending from a proximal end portion of the gate in the axial direction, wherein the outer surface of the gate at a part thereof protruding toward the flow path when the gate is in an open position is configured as a streamlined curved surface.

The gate valve according to the above-described aspect reduces the occurrence of turbulence around the gate and enables fluid flow around the gate to be regulated. Thus, a larger volume of fluid can flow even when the gate is in mid-stroke (while part of the gate is blocking the linear flow path). As a result, the gate valve enables a large volume of fluid to flow with smaller stroke movements and can be manufactured on a commercial basis with reduced stroke movements compared with those of known technologies.

BRIEF DESCRIPTION OF DRAWINGS

FIG. 1A is a sectional perspective view of a gate valve according to a first embodiment of the present invention, FIG. 1B is a perspective view of a gate body and a stem of the gate valve in FIG. 1A, and FIG. 1C is a cross-sectional view of the gate body in FIG. 1B;

DESCRIPTION OF EMBODIMENTS

Figure 2:
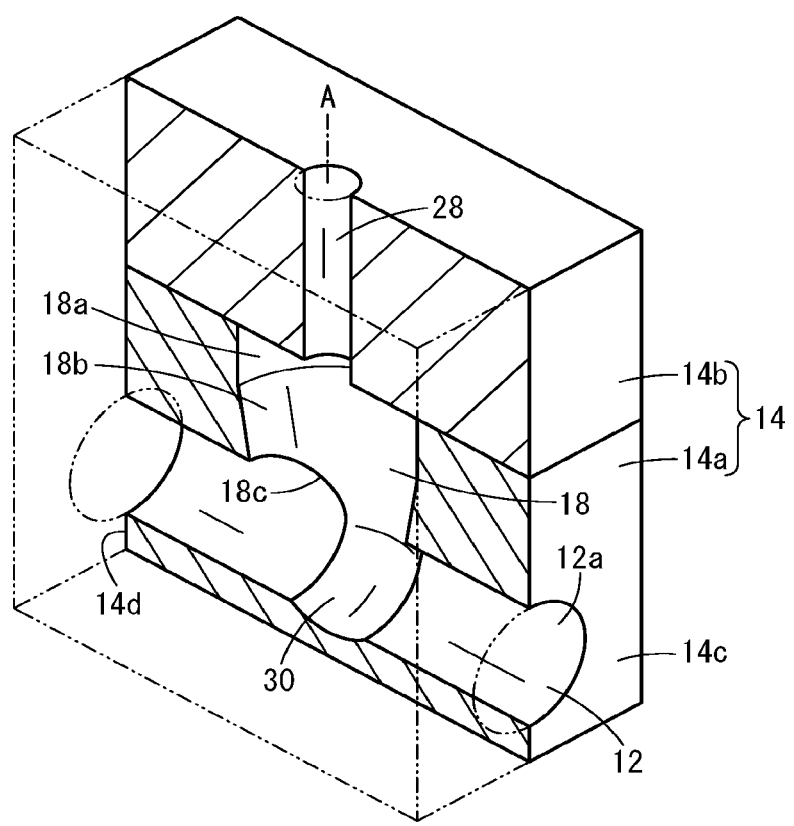
FIG. 2 is a perspective view of a flow path and a valve chamber in the gate valve in FIG. 1A.

Preferred embodiments of the present invention will be described in detail below with reference to the accompanying drawings. The ratio of the dimensions in the drawings may be exaggerated and differ from the actual ratio for ease of explanation. In the description below, a direction along which a gate is pushed into a flow path is referred to as "downward" or "lower side", and a direction along which the gate is retracted toward a valve body is referred to as "upward" or "upper side". However, this does not limit the direction the gate valve faces when the gate valve is installed.

First Embodiment

As illustrated in FIG. 1A, a gate valve 10 according to this embodiment includes a valve body 14 with a linear flow path 12, a gate 16 configured to move up and down in the axial direction orthogonal to the flow path 12 to open and close the flow path 12, a valve chamber 18 accommodating the gate 16, and a stem 20 extending from a proximal end portion 16a of the gate 16 in the axial direction. Fluid flowing through the flow path 12 includes gas such as air and steam (including vapor), gas at reduced pressure such as vacuum pressure, liquid such as water and oil, and fluid such as gel and mixtures of solid particles and liquid. The gate valve 10 opens and closes to allow the fluid to flow and to stop the fluid from flowing.

The gate 16 can move up and down in a direction of an axis A perpendicular to the flow path 12. When the gate 16 moves downward to the lower end, the outer surface of the gate 16 comes into contact with an inner wall (inner surface) 12a of the flow path 12 to close the flow path 12. The gate 16 includes a gate body 22 made of, for example, metal or resin, and a seal member 24 covering the outer surface of the gate body 22. The gate 16 may include only the gate body 22 made of metal or resin without being covered. In this case, the gate body 22 of the gate 16 directly comes into contact with the flow path 12 in the valve body 14 to close the flow path 12.

As illustrated in FIG. 1B, the gate body 22 has circular symmetry around the axis A. The gate body 22 includes, adjacent to a proximal end portion 22a, a tapered portion 22c which has a diameter gradually decreasing toward a distal end 22b. The gate body 22 includes, adjacent to the distal end 22b, a distal end portion 22d which has a spherical outer surface. It is preferable that the spherical surface of the distal end portion 22d have a radius of curvature larger than or equal to that of the inner wall 12a of the flow path 12 to reliably bring the distal end 22b of the gate body 22 into firm contact with the inner wall 12a. The gate body 22 is not limited to having circular symmetry around the axis A and may have any other shape streamlined along the direction of flow in the flow path 12. In this case, the gate body 22 may have, for example, an elliptical shape elongated in the direction of the flow path.

The border part connecting the tapered portion 22c and the distal end portion 22d has a smoothly continuing curved surface. It is preferable that the outer surfaces of the tapered portion 22c and the distal end portion 22d be streamlined curved surfaces to prevent turbulence in the fluid flowing near the gate 16. As illustrated in FIG. 1C, the gate body 22 has a circular outer shape when viewed from the distal end 22b. Thus, the gate 16 has a circular cross-section when cut in a direction perpendicular to the axis A.

The seal member 24 covers the outer circumferential portion of the gate body 22 to constitute the outer surface of the gate 16. The seal member 24 may be made of, for example, an elastically deformable material including rubber, elastomers, nylon, polyethylene, and fluoropolymers such as polytetrafluoroethylene. The seal member 24 may be formed by coating the surface of the gate body 22 with the above-described material. The seal member 24 may be a cap member produced using the above-described material and attached to the surface of the gate body 22.

The structure of the gate 16 is not limited to that including the seal member 24 disposed on the surface of the gate body 22, and the seal member 24 may not necessarily be disposed on the surface as a separate member. That is, the gate body 22 may be made of the above-described elastically deformable material. In addition, the gate body 22 may be made only of metal or resin.

The stem 20 extends from the proximal end portion 22a of the gate body 22. The stem 20 is cylindrical and extends linearly upward in the direction of the axis A of the gate 16. The stem 20 may be integrated with the gate body 22. The stem 20 extends to the outside of the valve body 14, and a drive mechanism (not illustrated) is attached to an end portion 20a of the stem 20. The drive mechanism drives the stem 20 and the gate 16 in the direction of the axis A. A packing 26 is attached to an outer circumferential portion of the stem 20. As illustrated in FIG. 1A, the packing 26 is brought into contact with a through-hole 28 for placing the stem 20 through the valve body 14, thereby airtightly and fluid-tightly sealing the valve chamber 18.

As illustrated in FIG. 2, the valve body 14 includes the flow path 12, the valve chamber 18, and the through-hole 28. The flow path 12 has a linear shape and passes through the valve body 14 from a first side portion 14c to a second side portion 14d. The flow path 12 has a circular cross-section. The cross-section of the flow path 12 is not limited to circular and may be rectangular or polygonal. The flow path 12 includes a seal groove 30 at a position close to the middle. The seal groove 30 is created in a part brought into contact with the gate 16. The seal groove 30 extends in the circumferential direction of the flow path 12, and the upper end thereof is connected to an opening portion 18c of the valve chamber 18. The surface of the seal groove 30 may have a curvature. In this case, it is preferable that the curvature of the curved surface of the seal groove 30 be equal to that of the outer surface of the gate 16 to bring the outer surface of the gate 16 into firm surface contact with the surface of the seal groove 30. This improves sealing performance.

The surface of the seal groove 30 may not necessarily be a curved surface and may be a flat surface such as a slope. The surface of the seal groove 30 is not limited to the curved surface and may have any shape that can be brought into contact with the outer surface of the gate 16. In a case where the pressure of the fluid in the flow path 12 is low, that is, the gate 16 does not receive a high pressure, the seal groove 30 may not necessarily be provided.

The valve chamber 18 is disposed above the flow path 12. The valve chamber 18 includes an inclined portion 18b connected to the flow path 12, and a cylindrical portion 18a including a cylindrical hollow and disposed above and connected to the inclined portion 18b. The cylindrical portion 18a includes a cylindrical hollow extending in the direction of the axis A and has an inner diameter slightly larger than the diameter of the proximal end portion 16a of the gate 16. The inclined portion 18b has a funnel shape with an inner diameter decreasing toward the bottom along the direction of the axis A.

The lower end part of the inclined portion 18b serves as the opening portion 18c opened in the flow path 12. The valve chamber 18 communicates with the flow path 12 via the opening portion 18c. It is preferable that the inclination angle (angle with respect to the axis A) of the inner surface (tapered surface) of the inclined portion 18b be substantially equal to the inclination angle (angle with respect to the axis A) of the tapered portion 22c of the gate body 22. When the gate 16 is pushed downward to the lower end, the tapered portion 22c of the gate body 22 comes into surface contact with the inclined portion 18b to close the opening portion 18c of the valve chamber 18. The volume of the valve chamber 18 is substantially equal to the volume of the gate 16.

The through-hole 28 is formed above a central portion of the upper end of the valve chamber 18. The through-hole 28 has an inner diameter substantially equal to the diameter of the stem 20 and passes through the valve body 14 toward an upper portion of the valve body 14. The stem 20 is fitted in the through-hole 28.

For example, the valve body 14 may include two members, that is, a first portion 14a extending to the upper end of the valve chamber 18 and a second portion 14b covering the upper end of the valve chamber 18. To install the gate 16 in the gate valve 10, the second portion 14b is separated from the first portion 14a so that the upper end of the valve chamber 18 becomes open. After the gate 16 is inserted into the valve chamber 18, the second portion 14b is mounted on the first portion 14a and secured to the first portion 14a. The gate 16 can be fitted in the valve chamber 18 in this manner.

Next, the effects of the gate valve 10 configured as above will be described.

Figure 3:
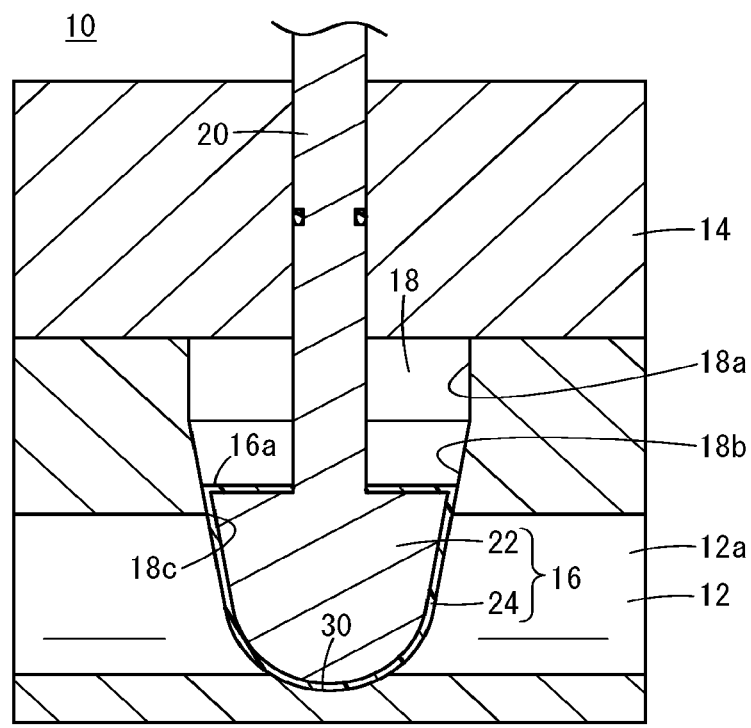
FIG. 3 is a cross-sectional view of the gate valve in FIG. 1A in a closed state.

As illustrated in FIG. 3, while the gate 16 is completely lowered, the seal member 24 of the gate 16 is in contact with the inner wall 12a of the flow path 12 and the inclined portion 18b, and thereby the flow path 12 is closed by the gate 16. At this time, the surface of the seal member 24 enters the seal groove 30 to come into surface contact with the seal groove 30. Thus, even when the seal member 24 receives a force caused by the pressure of fluid upstream of the flow path 12, the seal member 24 held by the seal groove 30 does not deform, and the sealing performance is maintained. At this moment, the upstream pressure remains in the valve chamber 18, and the gate 16 receives a biasing force pushing the gate 16 downward. Thus, in a case where the pressure of fluid flowing in the flow path 12 is high, the sealing performance further improves.

The downward biasing force caused by the pressure remaining in the valve chamber 18 and acting on the gate 16 can be adjusted as appropriate by changing the area of the proximal end portion 16a of the gate 16. That is, the area of the proximal end portion 16a of the gate 16 decreases by increasing the diameter of the stem 20, and the downward biasing force acting on the gate 16 decreases accordingly. While closed, the gate 16 receives a force pushing the gate 16 upward caused by the pressure from the fluid upstream of the flow path 12. Thus, the upward force caused by the pressure from the upstream fluid and the downward biasing force caused by the pressure in the valve chamber 18 may be balanced (made substantially equal) by adjusting the area of the proximal end portion 16a of the gate 16 as appropriate. In this case, the gate 16 can be pulled upward from the closed state with a small operating force.

Figure 4A:
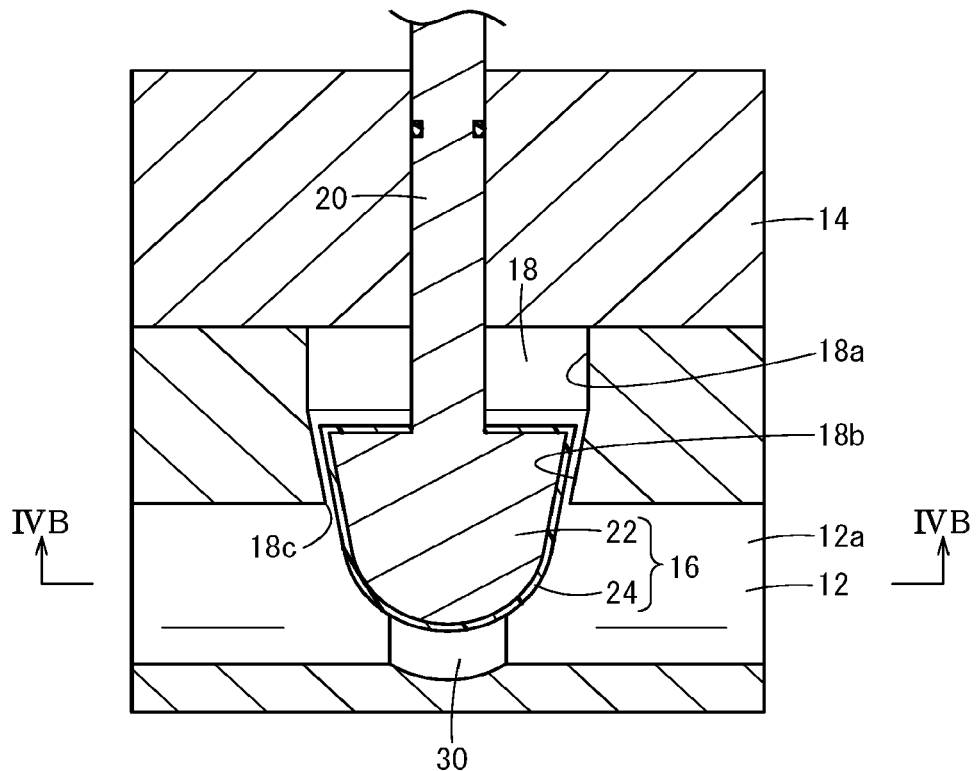
FIG. 4A is a cross-sectional view of the gate valve in FIG. 1A in an open state.

As illustrated in FIG. 4A, when the gate 16 moves up and stops in mid-stroke, the gate 16 is separated from the inner wall 12a of the flow path 12, and fluid can flow through the flow path 12. At this moment, a gap is created between the inclined portion 18b and the gate 16, causing the valve chamber 18 to communicate with the flow path 12. As a result, the internal pressure of the valve chamber 18 and the internal pressure of the flow path 12 become equal.

Figure 4B:
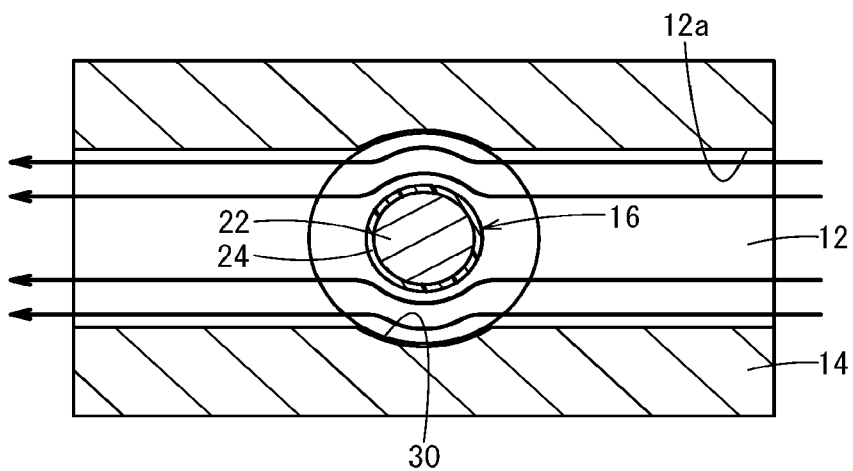
FIG. 4B is a schematic view illustrating flow of fluid at a section taken along line IVB-IVB in FIG. 4A.

As the gate 16 has rotation symmetry (circular symmetry), the cross-section thereof is circular as illustrated in FIG. 4B. This prevents turbulence in the fluid flowing around the gate 16 and maintains regulated flow. As the fluid flows smoothly around the gate 16, raising the gate 16 only slightly allows a larger volume of fluid to flow through the flow path 12.

The gate valve 10 produces the following effects.

The gate valve 10 includes the gate 16 having a curved outer surface streamlined along the flow path 12. This prevents turbulence in the fluid flowing around the gate 16 and allows a larger volume of fluid to flow through the flow path 12 even when the gate 16 stops in mid-stroke. As a result, the flow path 12 can be opened and closed with short strokes. In addition, a reduction in the stroke range leads to a reduction in the size of the drive mechanism of the gate 16.

Furthermore, the shape of the gate 16 is symmetric with respect to the direction of flow in the flow path 12. This allows the gate 16 to face any direction with respect to the valve body 14 and facilitates assembly of the gate 16 to the valve body 14. The gate 16 operates in the same manner regardless of in which direction fluid flows through the flow path 12.

In the gate valve 10, the distal end 22b of the gate 16 may be spherical. This further prevents turbulence in the fluid flowing around the gate 16. The part brought into contact with the flow path 12 is limited to a linear area (portion of the seal groove 30) extending in the circumferential direction of the flow path 12. Thus, the surface pressure at the contact part easily increases. This results in high sealing performance even in a case where the pressure of the fluid increases.

In the gate valve 10, the seal groove (recess) 30 hollowed outward in a radial direction of the flow path 12 may be formed at a part of the inner surface of the flow path 12, the part being brought into contact with the outer surface of the gate 16. The seal groove (recess) 30 may extend in the circumferential direction of the flow path 12 to have a groove shape. The seal groove 30 with the above-described structure holds the surface of the seal member 24 of the gate 16. This prevents deformation of the seal member 24 caused by the fluid pressure and thus improves the sealing performance.

The curvature of the seal groove (recess) 30 in the flow path 12 may be substantially equal to the curvature of the outer surface of the gate 16 at the part thereof brought into contact with the seal groove (recess) 30. This brings the outer surface of the gate 16 into firm contact with the seal groove 30, resulting in an improvement in sealing performance.

The valve chamber 18 may include the inclined portion 18b, and when the gate 16 is lowered to the flow path 12, the outer surface of the tapered portion 22c of the gate 16 may come into contact with the inclined portion 18b of the valve chamber 18 so that the valve chamber 18 is closed. This prevents fluid from flowing via the valve chamber 18. By raising the gate 16, the valve chamber 18 communicates with the flow path 12, and the internal pressure of the valve chamber 18 and the internal pressure of the flow path 12 become equal. As a result, an increase in vertical movement of the gate 16 is prevented even when the fluid pressure becomes higher, and the gate 16 can be operated with a small operating force.

A reduction in the stroke leads to a reduction in the height of the cylindrical portion 18a of the valve chamber 18. This reduces the size of a dead space inside the valve body 14, that is, the size of a liquid remaining spot. As a result, the gate valve 10 provides excellent replacement performance and allows fluid to flow without residual fluid remaining inside the valve body 14.

Second Embodiment

Figure 5A:
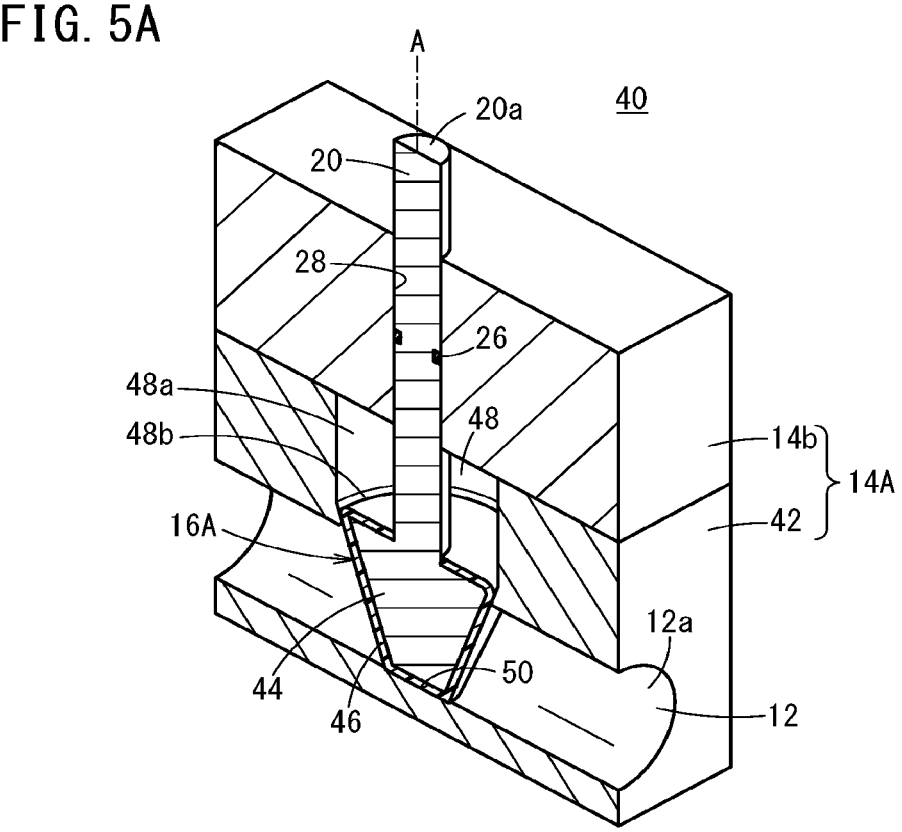
FIG. 5A is a sectional perspective view of a gate valve according to a second embodiment of the present invention.

As illustrated in FIG. 5A, a gate valve 40 according to this embodiment differs from the gate valve 10 in FIG. 1A in the shape of a gate 16A and the shape of a recess 50 created in the flow path 12. In the gate valve 40, the same reference numbers and symbols are used for structures similar to those of the gate valve 10 in FIG. 1A, and the detailed descriptions will be omitted.

Figure 5B:
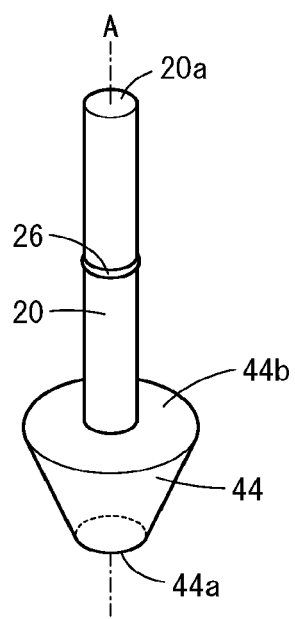
FIG. 5B is a perspective view of a gate body and a stem in FIG. 5A.

As illustrated in FIG. 5B, the gate 16A includes a gate body 44 with a flat surface 44a at the distal end thereof. The gate body 44 is tapered from a proximal end portion 44b to the flat surface 44a at the distal end such that the diameter gradually decreases. As illustrated in FIG. 5A, the surface of the gate body 44 is covered with a seal member 46.

Figure 6:
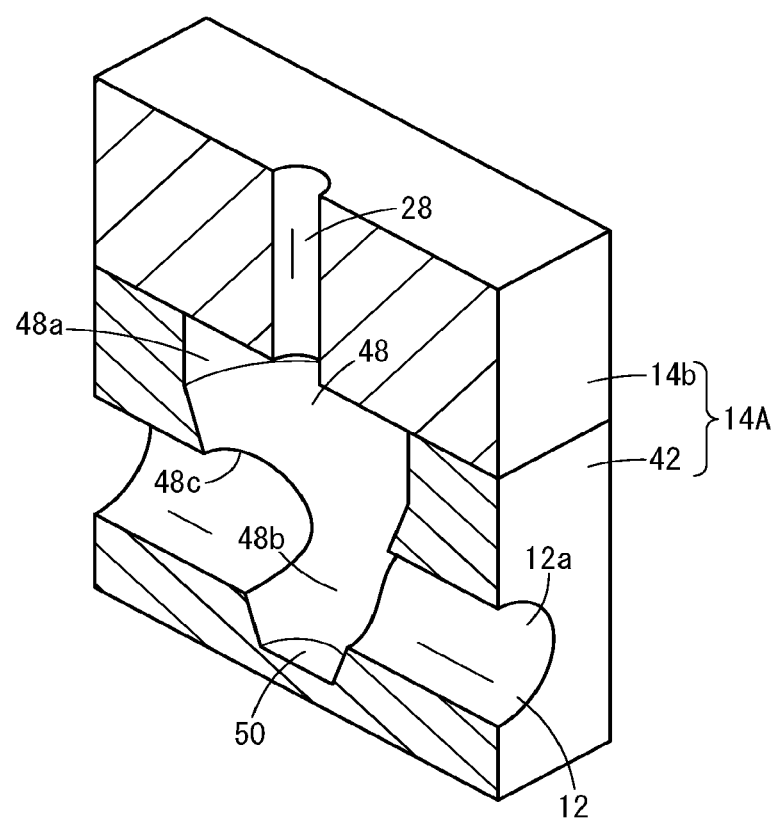
FIG. 6 is a sectional perspective view of a flow path and a valve chamber in the gate valve in FIG. 5A.

As illustrated in FIG. 6, a valve body 14A includes a second member 42 with the flow path 12. The second member 42 includes the recess 50 in a middle portion at the lower end of the inner wall 12a of the flow path 12 to accommodate the flat surface 44a at the distal end of the gate body 44. The recess 50 has an inner diameter substantially equal to the diameter of the flat surface 44a of the gate body 44. A valve chamber 48 is disposed above a middle portion of the flow path 12. The valve chamber 48 includes an inclined portion 48b communicating with the flow path 12 via an opening portion 48c, and a cylindrical portion 48a formed above the inclined portion 48b. The inclined portion 48b extends along the inner wall 12a of the flow path 12 in the circumferential direction of the flow path 12 and communicates with the recess 50.

The inner diameter of the cylindrical portion 48a is slightly larger than the diameter of the proximal end portion 44b of the gate 16A. The angle (angle with respect to the axis A) of the tapered surface of the inclined portion 48b is substantially equal to the inclination angle (angle with respect to the axis A) of the sidewall of the gate body 44 of the gate 16A. Thus, when the gate 16A is pushed downward, the gate 16A comes into surface contact with the inclined portion 48b to close the valve chamber 48. At this moment, the gate 16A comes into surface contact with the inclined portion 48b extending in the circumferential direction of the flow path 12 and the recess 50 to completely close the flow path 12. That is, the flat surface 44a of the gate body 44 comes into contact with the recess 50, which has a diameter equal to the diameter of the flat surface 44*a*, to airtightly and fluid-tightly close the flow path 12.

The structures of the gate body 44 and the recess 50 of this embodiment are not limited to the above. The side surface of the recess 50 may be tapered such that the diameter gradually decreases in a direction away from the flow path 12, and the bottom surface of the recess 50 may have a diameter smaller than the diameter of the flat surface 44*a*. In this case, the flat surface 44*a* of the gate body 44 comes into contact with the tapered side surface of the recess 50 to airtightly and fluid-tightly close the flow path 12. At this time, the gate body 44 is not necessarily in contact with the bottom surface of the recess 50. The above-described structure provides sufficient airtightness and fluid tightness even in a case where accuracy in machining the recess 50 and the gate body 44 is relatively low.

The gate valve 40 configured as above produces the following effects.

The gate 16A of the gate valve 40 is tapered such that the diameter decreases toward the distal end, and the distal end portion of the gate 16A is configured to be the flat surface 44*a* parallel to the flow path 12. This prevents turbulence in the fluid flowing around the gate 16A and allows a larger volume of fluid to flow through the flow path 12 even when the gate 16A stops in mid-stroke. As a result, the flow path 12 can be opened and closed with short strokes.

In the gate valve 40, the flow path 12 also includes the recess 50 hollowed outward in a radial direction of the flow path 12, in the inner surface at the part brought into contact with the outer surface of the gate 16A. This results in high sealing performance even in the case where the pressure of the fluid increases.

Third Embodiment

Figure 7:
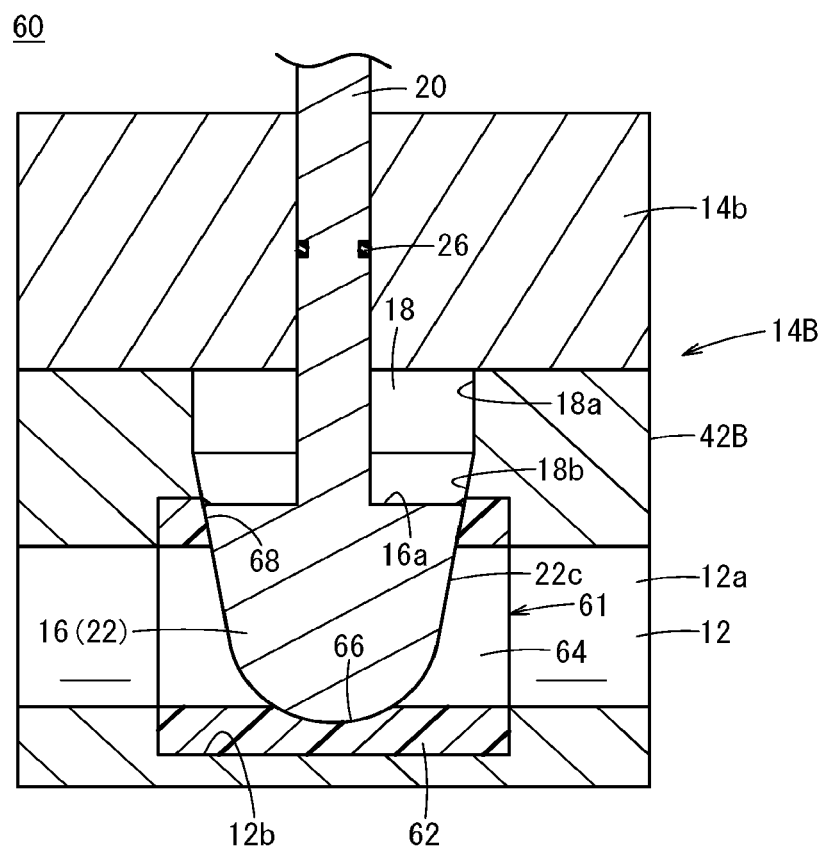
FIG. 7 is a cross-sectional view of a gate valve according to a third embodiment of the present invention.

As illustrated in FIG. 7, a gate valve 60 according to this embodiment differs from the gate valve 10 in FIG. 1A in that the flow path 12 is provided with a seal portion 61. In the gate valve 60, the same reference numbers and symbols are used for structures similar to those of the gate valve 10 in FIG. 1A, and the detailed descriptions will be omitted.

In the gate valve 60, a valve body 14B includes a second member 42B with the flow path 12. The flow path 12 includes an installation portion 12*b* formed by partially cutting off an inner circumferential portion of the flow path 12. The seal portion 61 is fitted in the installation portion 12*b*. The seal portion 61 is a substantially cylindrical member and is made of, for example, an elastically deformable material including rubber, elastomers, nylon, polyethylene, and fluoropolymers such as polytetrafluoroethylene.

The seal portion 61 includes a cylindrical body part 62, a flow path 64 formed inside the body part 62, a recess 66 brought into contact with the distal end of the gate 16, and an opening part 68 communicating with the valve chamber 18. The body part 62 has a radial thickness and an axial length respectively equal to the radial depth and the axial length of the cut-off portion constituting the installation portion 12*b*. The body part 62 includes the flow path 64 passing through the body part 62 in a direction parallel to the axis of the flow path 12. The inner circumferential surface of the flow path 64 is flush with the inner circumferential surface of the flow path 12. The recess 66 is created in the inner circumferential surface of the flow path 64 at a part brought into contact with the gate 16. The recess 66 has a shape similar to the shape of the seal groove 30 in FIG. 2 and extends in the circumferential direction of the flow path 64.

Moreover, the inner surface of the recess 66 has a curvature substantially equal to the curvature of the distal end portion of the gate 16. The gate 16 may include only gate body 22 without the seal member 24.

The opening part 68 is formed in an upper part of the body part 62 and passes through the body part 62 in the axial direction of the gate 16. The inner circumferential surface of the opening part 68 is inclined at the same angle as the surface of the inclined portion 18*b* of the valve chamber 18 and is flush with the surface of the inclined portion 18*b*. When the gate 16 is pushed downward to the closed position, the tapered portion 22*c* adjacent to the proximal end portion 16*a* of the gate 16 comes into surface contact with the inner circumferential surface of the opening part 68 to airtightly or fluid-tightly close the valve chamber 18.

According to the gate valve 60 configured as above, the seal portion 61 can be brought into firm contact with the gate 16 in an airtight or fluid tight manner. This ensures the sealing performance even in a case where the seal member 24 is not formed on the surface of the gate 16.

Fourth Embodiment

Figure 8A:
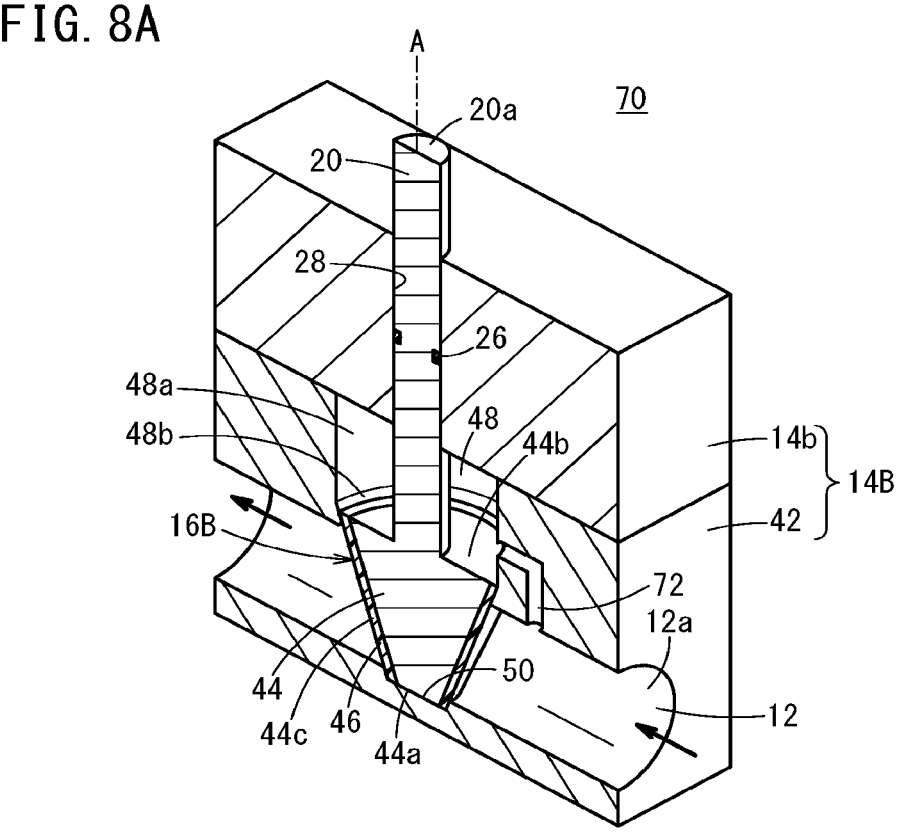
FIG. 8A is a sectional perspective view of a gate valve according to a fourth embodiment of the present invention.

As illustrated in FIG. 8A, a gate valve 70 according to this embodiment differs from the gate valve 40 in FIGS. 5A and 5B in the structure of a gate 16B and in that the gate valve 70 includes a communication path 72. In the gate valve 70, the same reference numbers and symbols are used for structures similar to those of the gate valve 40 in FIGS. 5A and 5B, and the detailed descriptions will be omitted.

Figure 8B:
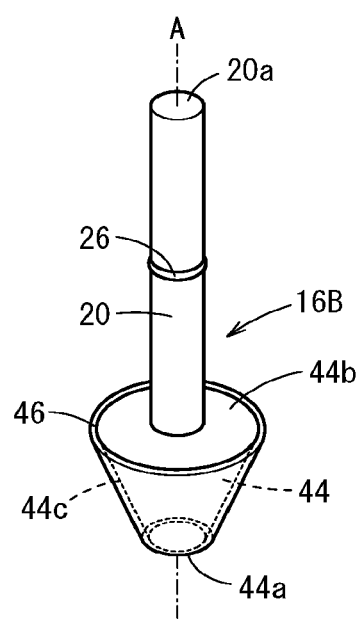
FIG. 8B is a perspective view of a gate body in FIG. 8A.

As illustrated in FIG. 8B, the gate 16B includes the gate body 44 with the flat surface 44*a* at the distal end thereof. The gate body 44 is tapered from the proximal end portion 44*b* to the flat surface 44*a* at the distal end such that the diameter gradually decreases. In this embodiment, only a side surface 44*c* of the gate body 44 is covered with the seal member 46. The proximal end portion 44*b* and the flat surface 44*a* of the gate body 44 are not covered with the seal member 46, and the flat surface 44*a* directly comes into contact with the recess 50.

As illustrated in FIG. 8A, the valve body 14B includes the communication path 72 enabling communication between the flow path 12 and the valve chamber 48. A first end of the communication path 72 communicates with the upstream part of the flow path 12, and a second end thereof communicates with the valve chamber 48. The structure of the second member 42 of the valve body 14B other than the above is similar to the structure of the second member 42 illustrated in FIG. 6.

The gate valve 70 configured as above produces the following effects.

In the gate valve 70 of this embodiment, the valve body 14B includes the communication path 72 enabling communication between the flow path 12 and the valve chamber 48. When the gate 16B is completely pushed down to close the flow path 12, the communication path 72 transfers the pressure in the upstream part of the flow path 12 to the valve chamber 48. As a result, the gate 16B is biased in a direction along which the gate 16B closes the flow path 12 due to the difference in pressure between the valve chamber 48 and the downstream part of the flow path 12. This improves sealing performance of the gate 16B and enables the gate 16B to close the flow path 12 more reliably.

In the gate 16B of this embodiment, the side surface 44*c* that is brought into surface contact with the inclined portion 48b of the valve chamber 48 to close the flow path 12 is covered with the seal member 46. This ensures sufficient sealing performance.

The application of the communication path 72 is not limited to this embodiment, and the communication path 72 may be provided for the gate valves 10, 40, and 60 described with reference to FIGS. 1A to 7. In this case, effects similar to those produced by the gate valve 70 can be achieved.

The embodiments of the present invention are not limited in particular to those described above, and various modifications can be made thereto. For example, the gate body 44 that is not covered with the elastic seal member 46 as illustrated in FIG. 5B may be used as the gate 16B. In this case, the metal surface of the gate body 44 directly comes into contact with the inclined portion 48b of the valve chamber 48 and the recess 50 (see FIG. 6) to airtightly and fluid-tightly close the flow path 12.

Moreover, for example, the gate body 22 illustrated in FIG. 1B may be used as the gate 16. In this case, the metal surface of the gate body 22 directly comes into contact with the seal groove 30 in the flow path 12 to airtightly and fluid-tightly close the flow path 12. The surface of the gate body 44 is not easily deformed by friction or pressure compared with the case where the gate body 44 is covered with the seal member 46 made of a material such as rubber and resin. Thus, the gate body 44 that is not covered with the seal member 46 achieves a gate valve with excellent wear and pressure resistances.

The invention claimed is:

1. A gate valve comprising:
   a valve body including a first flow path with a linear shape, and a valve chamber disposed in a side portion of the first flow path;
   a gate accommodated in the valve chamber and configured to move in an axial direction perpendicular to the first flow path to close the first flow path by bringing an outer surface of the gate into contact with an inner surface of the first flow path; and
   a stem extending from a proximal end portion of the gate in the axial direction, wherein
   the outer surface of the gate at a part thereof protruding toward the first flow path when the gate is in an open position is configured as a streamlined curved surface, wherein:
   a recess hollowed outward in a radial direction of the first flow path is formed at a part of the inner surface of the first flow path, the part being brought into contact with the outer surface of the gate by movement of the gate,
   a distal end portion of the gate is configured to be a flat surface parallel to the first flow path,
   and wherein the gate includes:
      a gate body that is gradually tapered from a proximal end portion to the flat surface at a distal end thereof such that a diameter thereof gradually decreases;
      a seal member that covers only a side surface of the gate body, and
      the flat surface of the gate body is not covered with the seal member and directly comes into contact with the recess.

2. The gate valve according to claim 1, wherein the recess extends in a circumferential direction of the first flow path to have a groove shape.

3. The gate valve according to claim 2, wherein a curvature of the recess is substantially equal to a curvature of the outer surface of the gate at a part thereof brought into contact with the recess.

4. The gate valve according to claim 1, wherein:
   the valve chamber includes a tapered surface with a diameter decreasing toward the first flow path; and
   when the gate is lowered to the first flow path, a tapered portion of the gate comes into contact with the tapered surface of the valve chamber to close the valve chamber.

5. The gate valve according to claim 1, wherein, while the gate valve is closed, a force pushing up the gate toward the valve chamber caused by a pressure from fluid in an upstream part of the first flow path and a force biasing the gate toward the first flow path caused by a pressure in the valve chamber are balanced.

6. The gate valve according to claim 1, further comprising a communication path enabling communication between the valve chamber and an upstream part of the first flow path, wherein
   while the gate valve is closed, the gate is biased toward the first flow path by a pressure in the valve chamber.

7. A gate valve comprising:
   a valve body including a first flow path with a linear shape, and a valve chamber disposed in a side portion of the first flow path;
   a gate accommodated in the valve chamber and configured to move in an axial direction perpendicular to the first flow path to close the first flow path; and
   a stem extending from a proximal end portion of the gate in the axial direction, wherein
   the outer surface of the gate at a part thereof protruding toward the first flow path when the gate is in an open position is configured as a streamlined curved surface, wherein:
   the valve chamber includes an inclined portion that is comprised of a tapered surface with a diameter decreasing toward the first flow path,
   the first flow path includes a seal portion brought into firm contact with the gate in an airtight or fluid tight manner, wherein the seal portion includes:
   a body part having a cylindrical shape,
   a second flow path that is formed inside the body part to communicate with the first flow path,
   a recess in the inner surface of the second flow path, that is brought into contact with the distal end of the gate to close the valve, and
   an opening part through a wall of the cylindrical shape in which the gate moves and that communicates with the valve chamber, and
   wherein an inner circumferential surface of the opening part is inclined at the same angle as a surface of the inclined portion of the valve chamber and is flush with the surface of the inclined portion.

8. The gate valve according to claim 7, wherein the inner circumferential surface of the opening part is inclined at the same angle as an angle of the outer surface of the gate.

* * * * *